United States Patent Office 3,426,113
Patented Feb. 4, 1969

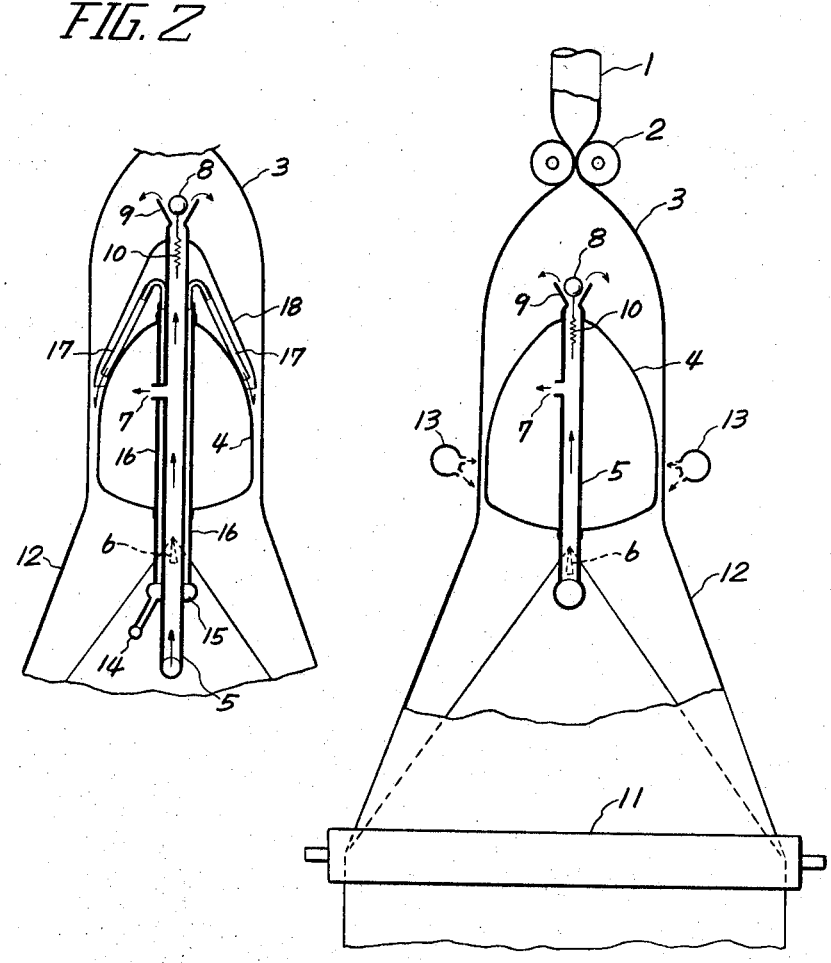

3,426,113
BIAXIAL AFTER-STRETCHING OF THERMO-PLASTIC TUBULAR FILM
Masahide Yazawa, Tokyo, Japan, assignor to Polymer Processing Research Institute Ltd., Itabashiku, Tokyo, a corporation of Japan
Filed Dec. 6, 1965, Ser. No. 511,837
U.S. Cl. 264—95  7 Claims
Int. Cl. B29d 7/24

ABSTRACT OF THE DISCLOSURE

A method of biaxially after-stretching a thermoplastic tubular film. The tubular film is fed while it is hot and passed over an inflatable mandrel which is inflatable to the maximum diameter to which the tubular film is to be stretched. Simultaneously the film is drawn longitudinally at a speed faster than the speed at which it is supplied to the mandrel. A fluid under pressure is supplied to the inflatable mandrel for inflating the mandrel to a diameter equal to the maximum diameter of the film at a predetermined desired inflation ratio. The supplying of fluid is such that it enables the mandrel to deflate under the pressure of the film when the film collapses. Fluid under pressure is supplied to the space above the mandrel and within the tubular film at a pressure sufficient to expand the film to the maximum diameter at a predetermined desired inflation ratio. The pressure is also sufficient to cause the fluid to leak out of the film along the surface of the mandrel between the mandrel and the film to maintain the pressure within the film above the mandrel such that the film is at the desired inflation diameter. If a fault occurs in the film, the fluid under pressure will leak out of the space above the mandrel and the film will collapse and the mandrel will collapse within the film until the pressure is again built up inside the space above the mandrel after the fault has passed the mandrel, at which time the film and the mandrel will again expand.

---

This invention relates to a method for biaxially after-stretching thermoplastic tubular films which are produced in the first step by ordinary inflation process. This invention is concerned with an improvement of the method disclosed in a copending application Ser. No. 277,629 filed by the present inventor on May 7, 1962 and now U.S. Patent 3,313,870. In this prior application, there is disclosed a method for biaxially after-stretching thermoplastic tubular film using pressurized fluid which comprises after-stretching the preheated tubular film in the radial direction by introducing pressurized fluid while allowing the fluid to leak from a thin clearance formed between the stretching tubular film and a rigid mandrel inserted in the tubular film so as to determine the radial stretching ratio and maintaining the stretching pressure of fluid by the resistance of leaking fluid through said clearance and simultaneously longitudinally after-stretching by increasing the velocity of wind-up rollers relative to that of feed rollers.

However the operation of the above-mentioned method cannot be started until some length of the end of tubular film shaped in the first step is expanded by some means or others to pass over the rigid mandrel having a diameter greater than that of the tubular film and thereafter it is cut, opened and connected to a wind-up means so as to be able to supply pressurized fluid through a piping means extending through the mandrel for the purpose of stretching by inflation. In other words the method of the above-mentioned prior application has a drawback in that the starting operation is not so easy. Furthermore if the raw material film happens to have a pinhole and such a hole is enlarged during the after-stretching process, it causes a sudden drop of internal pressure within the stretching part due to the leakage of pressurized fluid directly into the open air and the inflation and stretching of tubular film cannot be effected. In such a case the film is caught by the mandrel and broken, and the operation must be stopped. Furthermore re-starting usually requires a relatively long preparation time to reestablish the above mentioned starting pressure. On this account, the above-mentioned method is not so attractive in a continuous operation consisting of the steps from extrusion, shaping of tubular film to the biaxial after-stretching.

An object of the present invention is to provide a method which overcomes the above-mentioned drawbacks of the prior invention.

The objects and other advantages can be attained by the method of the present invention which consists in inserting, instead of a rigid mandrel which serves to maintain the inflation pressure, a mandrel in the form of a flexible bag which is capable of inflating under an internal pressure greater than the stretching pressure of the tubular film so as to nearly contact the inside of the tubular film and to allow the diameter of said mandrel to change in proportion to that of tubular film, the flexible bag being set to inflate up to a diameter which is equal to that of tubular film at the pre-arranged inflation or stretching ratio at its maximum inflation and to shrink to a folded state at a stretch ratio smaller than the maximum.

As for the material of bag, thin tubular films of various kinds of elastomer may be useful but when the inflating fluid is at a high temperature, the bag must be formed of heat-resistant film. In the practical operation, it is more convenient to use a bag of heat-resistant thin cloth which has a conical form in the front half and a cylindrical form in the back half having a diameter perpendicular to the direction of travel of the film determinative of the radial stretching ratio of tubular film when it is inflated to its maximum size by pressurized fluid and in the inside of which an inner bag of thin rubber or other elastomer film is inserted to ensure the gas-tightness.

In the practical operation of after-stretching, the running tubular film may often touch the outer surface of the bag momentarily or locally. When a tubular film which is in the rubbery state due to heating is being biaxially stretched at a high speed e.g. 100 to 200 m./min. while directly contacting the outer surface of the bag, and even when the contact is momentary, it is necessary for ensuring continuous operation that the friction between them be as low as possible. In this regard it is preferable to use a cloth made of filament yarns than one made of spun yarns. A cloth made of polytetrafluoroethylene resin gives less friction, hence a better result than that made of other fibers.

A preferred embodiment of the invention has been chosen for purposes of illustration and description and is shown in the accompanying drawings, forming a part of the specification wherein FIGURE 1 is a schematic elevational view showing one embodiment of an apparatus for carrying out the method of the invention; and FIG. 2 is a schematic elevational view of a second embodiment of an apparatus for carrying out the method of the invention.

FIG. 1 shows a manner of carrying out the method of the invention in which a tubular film shaped in a first step is heated again up to its softening point and is biaxially after-stretched to produce a tenacious film by sending pressurized fluid into the tubular film. In this case both inflation and longitudinal stretching tension are much larger than those of first step extrusion and inflation shaping.

Referring first to FIGURE 1, it can be seen that a tubular film shaped in the first step is preheated at a temperature suitable for stretching and then biaxially after-stretched by the pressurized gas introduced in the tubular film after it is tightly clamped by a set of pinch rollers while it is running backward. (In FIGURE 1 backward corresponds to downward.) A bag mandrel which serves to maintain the inflation pressure is supported on a member 42, and, a pressurized gas pipe 5 and the like are supported on the member 4a which is below the level at which after the tubular inflated film is cut and opened by a knife 6. The pressurized gas sent through the gas pipe 5 is charged into the interior, the tubular film after filling the bag and passing through a gas-inlet equipped with an automatic pressure regulating device. The automatic pressure regulation device has a combination of light ball valve 8 placed at the end of the pipe 5, a valve seat 9 and a spring balance 10 exerting an attractive force corresponding to the differential pressure between the internal pressure of the bag and the stretching pressure of the tubular film in the stationary state upon the ball-valve. After passing over the outer surface of the bag mandrel the stretched film is cut, opened and driven by a set of rollers revolving with a surface velocity corresponding to a longitudinal stretching ratio and is then taken up on rollers (not shown).

In starting operation, the raw tubular film shaped in the first step after passing the shrunk bag mandrel, is cut in the longitudinal direction and opened, and after passing between rollers 11, is taken up on wind-up rollers. Then pressurized gas is charged into the bag through the pipe 5. The bag inflates maintaining a small clearance between the inner surface of the tubular film and the outer surface of the bag and then the ball valve 8 opens to feed pressurized gas into the interior of the tubular film. In accordance with the increase of diameter of the mandrel, the diameter or the tubular film is also increased by inflation and the inflation pressure is maintained by the resistance of leaking pressurized gas passing through the thin clearance around of the bag mandrel. When the diameter of the tubular film is increased to the maximum diameter of the cylindrical part of the bag mandrel, the clearance produced by the leaking pressurized gas at the outer surface of the bag mandrel becomes greater because the diameter of the bag mandrel cannot be increased beyond the above-mentioned maximum value. Greater leakage reduces the inflation pressure and, hence reduces the diameter of the stretching tubular film. When the diameter of the film is reduced too much, the leakage of gas is reduced, hence the stretching pressure and subsequently the diameter of the stretching tubular film are also increased. In other words, the operation is brought to a balanced state by establishment of equilibrium between the amount of pressurized gas fed and the amount which leaks out. The stretched tubular film 3 is cooled by cooling fluid, sprayed from holes in pipes 13. It is preferable to use water as a coolant when the stretching operation is carried out at a high take-up velocity such as 100 to 200 m./min. Air cooling can be used when the take-up velocity is in the range of 40 to 60 m./min.

FIGURE 2 is a schematic representation of one procedure for cooling the stretched tubular film from the inside, i.e., at the outer surface near the largest peripheral circle formed by the cross section perpendicular to the direction of travel of the tubular film of the cylindrical part of the bag mandrel. In this figure, cooling water supplied through a pipe 14 and a header 15 separates into a number of narrow branch-tubes of copper 16 which are embedded in a thickened wall of the tube 5. The bag mandrel 4 is fastened onto the outside of the tube 5. The ends of the copper tubes are in the shape of nozzles and are bent back on themselves at nearly 180° to a position in front of the position at which the bag mandrel is mounted on the tube 5. A number of narrow rubber tubes 17 are connected to the nozzles of the respective copper tubes and disposed over the upper or front surface of the mandrel at approximately equal intervals. The ends of the rubber tubes are opened at the part near the front end of the bag mandrel. A thin conical polytetrafluoroethylene film 18, the top of which is fixed to the tube 5 at the position in front of the rubber tubes 17, covers the rubber tubes 17 wholly. By the use of this construction, it is possible to inject water to cool the stretched tubular film at its inside, i.e., at the outer surface of the cylindrical part of the bag mandrel, while making the direction of flow of cooling water the same as that of the travelling tubular film. Since the cooling water tubes placed upon the front conical surface of the bag mandrel in this construction are a number of rubber tubes, they do not interrupt the free inflation and deflation of the bag. Even when the tubular film touches the conical surface of the bag mandrel, the contact is indirect because of the existence of the separator film. When heated air is used as an inflation fluid in this construction, the thin layer on the outside of the bag mandrel consists of a mixture of leaking air and injected cooling water. If steam is used for inflation, the leaking steam condenses in the cooling water but if a relatively large amount of water is used, cooling can be fully attained. Since cooling water reduces the friction between the stretched film and the bag mandrel, this type of procedure can be used advantageously in a high speed stretching operation.

If a tubular film shaped in the first step happens to have a pinhole which is enlarged during the stretching process, the leakage of pressurized fluid through such a hole into the open air reduces the inflation pressure, and the bag pressure, falls due to the increase of the amount the ball valve opens, which leads to an increase in the amount of feed to increase the inflation pressure. Hence the bag is reduced in diameter and easily passes the said defective tubular film over it by the successively correlated actions; increase of the amount of opening of the ball valve, and increase of the amount of feed of pressurized gas. Thus continuous working is maintained. After the part with the hole has passed, the bag is again inflated by the feed of pressurized gas, increasing the radial stretching ratio until it reaches the equilibrium point and renders the operation stable. In other words, it is one of the features of the present invention that interruption of operation is not necessary even if the starting material of the first step tubular film contains a flaw or a pinhole. Insufficiently stretched parts before and after the hole or flaw can be removed by product inspection after being wound up.

The method of the present invention can be used advantageously when the first step of extrusion and shaping and the after treatment of biaxial stretching are carried out in continuous manner. It is a notable advantage of the present method that continuous operation can be carried out particularly in the case of high speed shaping.

In the application of the present invention, if the material of the tubular film is made of a resin such as polyvinyl chloride or polystyrene, it is not so crystallized in the preheating process that the tubular film can be preheated up to a sufficiently high temperature. Hence in such a case even air at room temperature can be used as a pressurized gas for the inflation. However, if a resin such as high density polyethylene or polypropylene which is liable to crystallize during preheating has been used, it is confirmed by experiment that the cooling in the first step shaping must be carried out by a quenching process to prevent crystallization, the preheating of the after-stretching must be also carried out at a low temperature so as to prevent crystallization, and pressurized fluid must be maintained at a high temperature so as to effect simultaneous preheating and inflation. Although the pressurized gas fed from the same source is used as a bag and inflation pressure, it does not matter if the inflation gas and the gas in the bag are from different sources. For example, if saturated steam is used as an inflation fluid, the use of air as a pressurized gas in the bag is preferable because there is no fear of deposit of condensation in the bag. The use of saturated steam is very convenient for materials such as polyvinyl chloride or polystyrene, for which the suitable stretching temperature lies in the range of about 100 to 105° C. Since saturated steam can heat a tubular film with its latent heat of vaporization, it enables easy, quick, and uniform heating and streaching under tension. It is of course preferable in this case to use a water cooling system for cooling stretched film in which feed of water is carried out by the use of the above-mentioned copper tubes and rubber tubes because leaking steam condenses into the cooling water. For those resins such as polyethylene, polypropylene and the like for which the suitable stretching temperature lies in the range of 130 to 160° C., a high temperature pressurized air is used as an inflation gas because air makes the selection of temperature and pressure easy and free.

It is possible to position the apparatus of the present invention either vertically or horizontally while making the travel of the film vertical or horizontal, respectively. As for the inflation fluid, either gas or liquid can be used depending upon the thickness of the film and in the case of thin film, gas is preferred.

The method of the present invention can be used not only for films of polymers described above but also films of resins such as polyvinyl alcohol, nylon, polyester, copolymers thereof, acetyl cellulose, and coagulating viscose film or the like.

The present invention will be more fully understood from the following examples which are offered by way of illustration and not by way of limitation.

Example 1

A tubular film prepared by a conventional inflation process from polyvinyl chloride having stabilizers but not a common plasticizer in the first step shaping and having a diameter of 100 mm. and a thickness of 0.07 mm., was preheated at a temperature of 100° C. in a preheating chamber and subjected to after-stretching in the apparatus of FIGURE 1. Air having a pressure of 160 mm. water column was supplied to a bag mandrel. The bag had a conical shape at the front half and a cylindrical shape at the back half. The diameter at the top of the cone was 90 mm. that of the bottom connected with the cylindrical part was 250 mm. The length of the cylindrical part was 50 mm. The above-mentioned diameter of the cylindrical part was the value at the maximum inflation which defined the radical stretching ratio. The bag was constructed with an inner bag of thin polypropylene tube and an outer bag of cloth made of thin polyfluoroethylene filaments. The inflation air was fed by means of the internal pressure of the bag as a pressure source to the interior of the tubular film through the opening of the ball valve consisting of a rubber balloon placed at the top of the pressurized air feed pipe. Since the ball valve was biased to a closed position by a spring having a tension of 40 mm. water column, the inflation pressure was 120 mm. water column. When a defective part of original film having a pinhole passed the present apparatus and the inflation pressure dropped suddenly, the opening of the valve increased and the inflation pressure was quickly recovered by an automatic regulation. The pressurized air leaked backward through a thin clearance at the outside of the cylindrical part of the bag and the inflation pressure was maintained by the resistance of the leaking air. After it was inflated, the stretched film was cut and wound up at a velocity twice as fast as the feed velocity. The product of the longitudinal and transversal stretching ratio was 5 and the take-up velocity after stretching was 100 m./min. The operation was carried out very smoothly. Even when the inflation pressure dropped suddenly during the operation on account of a pinhole in the film there was no break-down as the bag was forced to shrink and the tubular film could pass over the bag mandrel. As soon as the hole passed by, the diameter of bag increased and the prefixed radial stretching ratio was recovered automatically and the operation was not stopped at all. Cooling was carried out by spraying water from a circular tube installed at the outside of the cylindrical part of the bag by which the shrinkage of stretched film was prevented.

By the experiment carried out with the apparatus shown in FIGURE 1, it was found that in proportion as the inflation pressure increased, or with the increase of the thickness of the film, or with the lowering of the temperature or with an increase of stretching ratio, a longer cylindrical part of the bag rendered the operation easier.

When saturated steam having a temperature of 103° C. at the supply pipe therefor was used in the present instance, the preheating step of the raw material of the tubular film can be omitted. In other words, heating and inflation could be carried out simultaneously by simply feeding steam into the tubular film during the stretching time. However the cooling of stretched film was carried out by the injection of the above-mentioned cooling water fed through a number of small rubber tubes connected with copper tubes.

Example 2

A tubular film having a diameter of 100 mm. and a thickness of 6/100 mm. which was shaped in the first step by extruding polypropylene in an inflation type extruder followed by quenching at a temperature lower than 0° C., was preheated at a temperature of 120° C. during its travel from the first step apparatus to the after stretching apparatus of Example 1. Extremely smooth stretching was carried out under conditions in which the temperature of the inflation gas was 160° C., the bag pressure was 180 mm. water column, the internal pressure of the inflating part was 140 mm. water column, the radial stretching ratio was 2, the longitudinal stretching ratio was 2.5 and the cooling was effected by water sprayed from the outside of the tubular film and the take-up velocity was 100 m./min.

I declare that what I claim is:

1. A method of biaxially after-stretching a thermoplastic tubular film, comprising the steps of feeding the tubular film while it is hot and passing it over an inflatable mandrel which is inflatable to the maximum diameter to which the tubular film is to be stretched, while simultaneously drawing the film longitudinally at a speed faster than the speed at which it is supplied to the mandrel, and supplying a fluid under pressure to the inflatable mandrel for inflating the mandrel to a diameter equal to the maximum diameter of the film at a predetermined desired inflation ratio, the supplying of fluid enabling the mandrel to deflate under the pressure of the film when the film collapses, and supplying a fluid under pressure to the space above the mandrel and within the tubular film at a pressure sufficient to expand the film to the maximum diameter at a predetermined desired inflation ratio and to cause the fluid to leak out of the film along the surface of the mandrel between the mandrel and the film to maintain the pressure within the film above the mandrel such that the film is at the desired inflation diameter, whereby if a fault occurs in the film, the fluid under pressure will leak out of the space above the mandrel and the film will collapse and the mandrel will collapse within the film until the pressure is again built up inside the space above the mandrel after the fault has passed the mandrel, at which time the film and the mandrel will again expand.

2. A method as claimed in claim 1 in which the fluid under pressure fed to the space above the mandrel is fed thereto from the fluid under pressure in the mandrel, whereby the loss of pressure in the space above the mandrel due to a fault in the film causes a sudden loss from the fluid under pressure in the mandrel, aiding in the collapse of the mandrel under the pressure of the collapsing film.

3. A method as claimed in claim 2 in which the flow of fluid from the mandrel to the space above the mandrel is valved to balance the pressure in the mandrel and the pressure above the mandrel to maintain the film at the desired inflation ratio.

4. A method as claimed in claim 1 in which the fluid under pressure in the mandrel and the fluid under pressure in the space above the mandrel are fed from separate sources.

5. A method as claimed in claim 4 in which the fluid under pressure fed to the space above the mandrel is saturated steam at superatmospheric pressure, and the fluid under pressure fed to the mandrel is air.

6. A method as claimed in claim 1 further comprising flowing a liquid medium over the mandrel from within the tubular film above the mandrel along the sides of the mandrel between the mandrel and the stretched film.

7. A method as claimed in claim 6 in which said liquid medium is water piped through said mandrel.

References Cited

UNITED STATES PATENTS

| | | | |
|---|---|---|---|
| 2,433,937 | 1/1948 | Tornberg | 18—14 |
| 2,966,700 | 1/1961 | Dyer et al. | 264—95 |
| 2,987,765 | 6/1961 | Cichelli | 264—95 |
| 3,125,616 | 3/1964 | Cook et al. | 264—40 |
| 3,304,352 | 2/1967 | Gerow | 264—95 |

FOREIGN PATENTS

| | | |
|---|---|---|
| 1,355,708 | 2/1964 | France. |

ROBERT F. WHITE, *Primary Examiner.*

A. R. NOE, *Assistant Examiner.*

U.S. Cl. X.R.

264—40, 314